United States Patent [19]

Hamada et al.

[11] 4,310,444

[45] Jan. 12, 1982

[54] FLAME RETARDANT SILICONE RUBBER COMPOSITIONS

[75] Inventors: Mitsuo Hamada, Chiba; Sadami Yasuda, Ichihara, both of Japan

[73] Assignee: Toray Silicone Company, Ltd., Tokyo, Japan

[21] Appl. No.: 181,301

[22] Filed: Aug. 25, 1980

[30] Foreign Application Priority Data

Sep. 14, 1979 [JP] Japan ................................ 54-118405
Sep. 14, 1979 [JP] Japan ................................ 54-118406

[51] Int. Cl.$^3$ ................................................ C08K 3/10
[52] U.S. Cl. ............................... 260/18 S; 260/37 SB; 260/DIG. 24
[58] Field of Search ........................... 260/18 S, 37 SB

[56] References Cited

U.S. PATENT DOCUMENTS

| | | | |
|---|---|---|---|
| 3,532,649 | 10/1970 | Smith | 260/18 S |
| 3,734,877 | 5/1973 | Christie | 260/18 S |
| 3,821,140 | 6/1974 | Milbert | 260/18 S |
| 3,992,355 | 11/1976 | Itoh | 260/37 SB |
| 3,996,188 | 12/1976 | Laur | 260/37 SB |
| 4,045,390 | 8/1977 | Itoh | 260/18 S |

*Primary Examiner*—Paul R. Michl
*Attorney, Agent, or Firm*—Roger H. Borrousch

[57] ABSTRACT

Flame retardant silicone rubber can be prepared from organopolysiloxane, silica filler, platinum, a fatty acid or a metal salt of the fatty acid in which the fatty acid has at least 11 carbon atoms, organic peroxide and optionally a triazole. Such silicone rubber is transparent and flame retardant. Silicone rubber which does not require the transparency can be prepared from such compositions which include titanium dioxide to enhance the flame retardant properties.

41 Claims, No Drawings

FLAME RETARDANT SILICONE RUBBER COMPOSITIONS

BACKGROUND OF THE INVENTION

1. Field of the Invention

This invention relates to silicone rubber compositions with improved flame retardancy and to silicone rubber compositions having transparency and flame retardancy after curing.

2. Description of the Prior Art

Although silicone elastomers have various excellent characteristics, there is the drawback that they are combustible. Therefore, many methods for imparting flame retardancy have been proposed. For example, a silicone rubber compound with a platinum-containing material is known from U.S. Pat. No. 3,514,424. However, the use of platinum-containing material alone does not impart satisfactory flame retardancy. Many studies have attempted to improve the self-extinguishing ability by using other compounds in combination with the platinum-containing material. For example, the following compositions have been proposed: silicone rubber compounded with a platinum compound and fumed titanium dioxide as shown by U.S. Pat. No. 3,635,874, silicone rubber compounded with a platinum compound and a finely pulverized manganese carbonate as shown by U.S. Pat. No. 3,936,476, silicone rubber compounded with a platinum compound and $(FeO)_x(Fe_2O_3)_y$ where the ratio of x to y is 0.05 to 1.0 as shown by Japanese Pat. No. Sho 51[1976]-35501 and silicone rubber compounded with a platinum compound and $\gamma$-$Fe_2O_3$ as shown by Japanese Pat. No. Sho 53[1978]-44501.

Although these known compounds exhibit excellent flame retarding effects to a certain degree, they have the drawback that transparent silicone rubber cannot be obtained. On the other hand, there is an increasing demand for flame retardant silicone rubber having transparency through which a wiring section can be seen, from the standpoint of prevention of accidents especially in the fields of electrical and electronic devices.

In the case of a composition containing the above-mentioned platinum compound and fumed titanium dioxide, the electrical characteristics of the silicone elastomers are impaired. In the case of a composition containing the above-mentioned platinum compound and manganese carbonate, vulcanization is impaired using an acyl organic peroxide as a vulcanizing agent. In the case of a composition containing the above-mentioned platinum compound and $(FeO)_x(Fe_2O_3)_y$, the effect on the self-extinguishing ability is weak unless $(FeO)_x(Fe_2O_3)_y$ is compounded in a large quantity. On the other hand, the mechanical characteristics of silicone elastomers are impaired by adding a large amount of $(FeO)_x(Fe_2O_3)_y$.

SUMMARY OF THE INVENTION

This invention provides flame retardant silicone rubber compositions having excellent transparency, which can be used to produce molded products with satisfactory mechanical strength and heat resistance, and overcome the above-mentioned drawbacks. Transparent silicone rubber which exhibit flame retardant properties can be prepared from organopolysiloxane, silica filler, platinum, a fatty acid or a metal salt of the fatty acid where the fatty acid has at least 11 carbon atoms, optionally a triazole compound, and an organic peroxide.

This invention also provides improved flame retardant silicone rubber compositions which can be used to produce molded products with satisfactory mechanical strength and heat resistance, but which are not transparent and which overcome the above-mentioned drawbacks. These compositions can be prepared from organopolysiloxane, silica filler, platinum, titanium dioxide, a fatty acid or a metal salt of the fatty acid where the fatty acid has at least 11 carbon atoms, and an organic peroxide.

DESCRIPTION OF THE INVENTION

This invention relates to a flame retardant silicone rubber composition comprising (A) 100 parts by weight of an organopolysiloxane of the average unit formula

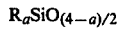

wherein each R represents a substituted or unsubstituted monovalent hydrocarbon radical and a has a value of from 1.95 to 2.05, (B) 10 to 150 parts by weight of a finely pulverized silica filler, (C) 2 to 200 ppm of platinum based on the weight of (A) or a platinum compound providing an equivalent amount of platinum, (D) 0.05 to 3 parts by weight of a fatty acid compound where the fatty acid of the compound has at least 11 carbon atoms selected from the group consisting of a fatty acid, a metal salt of the fatty acid, or a mixture thereof, and (E) 0.1 to 5 parts by weight of an organic peroxide.

The organopolysiloxanes used in this invention, component (A), are represented by the average unit formula $R_aSiO_{(4-a)/2}$ where each R represents a substituted or unsubstituted monovalent hydrocarbon radical selected from among methyl, ethyl, propyl, and phenyl radicals and their halogenated hydrocarbon derivatives, vinyl radical and allyl radical, and a has a value of from 1.95 to 2.05 and are primarily linear polydiorganosiloxanes. Examples of units constituting the polydiorganosiloxanes are dimethylsiloxane, methylphenylsiloxane, diphenylsiloxane, methylvinylsiloxane and phenylvinylsiloxane. Polydiorganosiloxanes are preferably those with high molecular weights which are generally called silicone gums. However, those which are applicable in this invention are not limited to these examples. Substances which are liquid at room temperature are also applicable. Component (A) can be a homopolymer or a copolymer or a mixture of both. A small quantity of $RSiO_{1.5}$ units can be present in this structure. Examples of end groups of the molecular chain are as follows: hydroxy group, alkoxy group, trimethylsiloxy group, dimethylvinylsiloxy group, methyldiphenylsiloxy group and methylphenylvinylsiloxy group. However, those which are applicable in this invention are not limited to these examples.

The finely pulverized silica fillers used in this invention, component (B), are those which have been used in silicone elastomers. Examples are fumed silica and precipitated silica. The particle size is preferably 50 micrometers or less and a finely pulverized silica with a specific surface area of 100 $m^2/g$ or greater is suitable. The surface of silica fillers can be either untreated or treated with an organosilicon compound such as organosilanes, organosiloxanes and organosilazanes. If the amount of component (B) added exceeds or is under certain levels, the mechanical characteristics of the silicone elastomers obtained after vulcanization are impaired. Thus, the appropriate amount of component (B) to be added ranges from 10 to 150 parts by weight relative to 100 parts by weight of component (A). A preferred amount of component (B) is 20 to 70 parts by weight per 100 parts by weight of component (A).

Component (C) used in this invention, contains 2 to 200 ppm and preferably 5 to 100 ppm of platinum based on the weight of component (A), or a platinum compound providing an equivalent amount of platinum. This is an indispensable component for imparting flame retardancy to the silicone elastomers. As metallic platinum, finely pulverized platinum or platinum powder supported on alumina, silica gel and asbestos can be used. Examples of platinum compounds are chloroplatinic acid or complexes of chloroplatinic acid with alcohols, ethers, aldehydes and vinylsiloxanes. It is very important to disperse the platinum or platinum-containing compound uniformly in the silicone rubber composition in order to be able to impart flame retardancy to the silicone elastomers obtained after vulcanization. Platinum or a platinum-containing compound can be dissolved or dispersed in an organic solvent such as isopropyl alcohol, ethanol, benzene, toluene and xylene, or in an organopolysiloxane oil, before use. Chloroplatinic acid is a preferred platinum compound.

The fatty acid compounds, component (D), are those compounds in which the fatty acid has 11 or more carbon atoms. The fatty acid compounds can be a fatty acid, a metal salt of the fatty acid, or mixtures thereof. The fatty acid compounds are also an important component for imparting flame retardancy without interference with the transparency of silicone rubbers. Not only are normal hydrocarbons applicable, but also isomers and those having unsaturated groups and substituents are applicable. With respect to the carboxylic acid functions, both monocarboxylic acids and polycarboxylic acids can be used. Preferably, the fatty acid of the fatty acid compound is a linear saturated monobasic fatty acid. Examples of fatty acids are as follows: monocarboxylic acids such as undecylenic acid, lauric acid, tridecylenic acid, myristic acid, pentadecylenic acid, palmitic acid, margaric acid, stearic acid, nonadecylenic acid, arachidic acid, heneicosanoic acid, behenic acid, tricosanoic acid, lignoceric acid, cerotic acid, montanic acid and melissic acid and polycarboxylic acids such as dodecanedioic acid, heptadecanedioic acid, eicosanedioic acid, tricosanedioic acid, triacontanedioic acid, $HOOC(CH_2)_{10}CH(COOH)_2$, and $HOOC(CH_2)_2CH(COOH)(CH_2)_{12}COOH$.

The metal salts of the fatty acids of the fatty acid compounds are the above-mentioned fatty acids in which a hydrogen atom of the carboxylic group is replaced with a metal atom. These salts are generally called metal soaps. Examples of the metals are magnesium, calcium, aluminum, lithium, barium, strontium, zinc, cadmium and lead. The preferred metal salts are those of zinc, calcium, aluminum and magnesium. However, those which are applicable in this invention are not limited to these examples. For convenience, commercial products are preferably used. Examples of commercial metal soaps are as follows: magnesium stearate, aluminum stearate, calcium stearate, lithium stearate, zinc stearate, strontium stearate, lead stearate, barium stearate, cadmium stearate, calcium chlorostearate, barium chlorostearate, cadmium chlorostearate, zinc laurate, barium laurate, cadmium laurate, magnesium laurate, zinc myristate, aluminum myristate, barium ricinoleate, zinc ricinoleate and cadmium ricinoleate. Since fatty acid salts of metals such as lead, cadmium and barium are toxic, it is better to avoid these metal salts. The metal soaps can also be basic salts such as $Al(OH)(C_{17}H_{35}COO)_2$ and $Al(OH)_2(C_{17}H_{35}COO)$. The fatty acids or fatty acid metal salts can be used in combinations of two or more types. The fact that component (D) in combination with component (C) has an excellent effect on imparting flame retardancy to the silicone rubbers is a totally unexpected phenomenon from examination of the chemical structure of component (D). The mechanism of action of component (D) is unknown. The flame retardancy of the silicone rubbers is rather impaired if the amount of component (D) exceeds or is under certain levels. An appropriate amount of component (D) ranges from 0.05 to 3 parts by weight relative to 100 parts by weight of component (A). The preferred amount of component (D) is from 0.1 to 2 parts by weight relative to 100 parts by weight of component (A).

The organic peroxides in the compositions of this invention, component (E), are used as a curing agent. Examples of component (E) are as follows: benzoyl peroxide, 2,4-dichlorobenzoyl peroxide, 2,5-bis(t-butylperoxy)-2,5-dimethylhexane, dicumyl peroxide, monochlorobenzoyl peroxide and t-butyl perbenzoate. An appropriate curing agent is selected according to the intended use. The amount of component (E) ranges from 0.1 to 5 parts by weight relative to 100 parts by weight of component (A), preferably from 0.1 to 1.5 parts by weight.

Triazole compounds can be used in the compositions of this invention. Although the triazole compounds are not required, flame retardancy of the transparent silicone rubbers can be further improved by adding these triazole compounds in conjunction with the actions of component (C) and component (D). Typical examples of triazole compounds are 1,2,3-triazoles, 1,2,4-triazoles and benzotriazoles.

Examples of 1,2,3-triazole derivatives are as follows: 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazol-4-aldehyde, 2-methyl-1,2,3-triazole-4-carboxylic acid, 4-cyano-1,2,3-triazole and 5-hydroxy-1,2,3-triazole-1-ylacetic acid.

Examples of benzotriazole derivatives are as follows: 1-methylbenzotriazole, 5,6-dimethylbenzotriazole, 2-phenylbenzotriazole, 1-hydroxybenzotriazole, methylbenzotriazole-1-carboxylate, 2-(3'-t-butyl-2'-hydroxy-5-methylphenyl)-5-chlorobenzotriazole, and 2-(3',5'-di-t-butyl-2'-hydroxyphenyl)-5-chlorobenzotriazole.

Examples of 1,2,4-triazole derivatives are as follows: 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one and 1-phenyl-urazole.

The triazole compounds usually have a high melting point. Therefore, they can be dissolved in an organic solvent such as ethanol, isopropyl alcohol, benzene, toluene and xylene for dispersing them uniformly in the silicone rubber compositions. The triazole compound can be used in an amount up to one part by weight per 100 parts by weight of (A), preferably in an amount of 0.1 to 0.7 part by weight. If the amount of component (E) exceeds one part by weight, it does not impart significant additional flame retardancy to the silicone rubbers and the vulcanization reaction is impaired.

The best transparent flame retardant silicone rubber is obtained from compositions prepared from 100 parts by weight of polydiorganosiloxane gum for component (A), 20 to 70 parts by weight of fumed silica or precipitated silica having a specific surface area of more than 100 $m^2/g$ for component (B), 5 to 100 ppm platinum added as chloroplatinic acid hexahydrate for component (C), 0.1 to 2 parts by weight of a saturated fatty acid and/or a zinc, aluminum, calcium or magnesium salt of the saturated fatty acid for component (D), 0.1 to 5 parts by weight of organic peroxide for component (E) and 0.1 to 0.7 part by weight of a triazole compound.

The flame retardant silicone rubber compositions of this invention are obtained by compounding the above-mentioned components (A) to (E). After curing, flame retardant silicone rubbers with transparency are produced. In addition to the above-mentioned components, if desirable, lower molecular weight organosilicon compounds such as diphenylsilanediol, alkoxysilane and hydroxyl endblocked polydimethylsiloxane can be also compounded into the composition.

In the fields in which transparency is not required, the following additives can be used: finely pulverized quartz powder, diatomaceous earth, calcium carbonate, calcium zirconate, zirconium silicate, carbon black containing essentially no sulfur, metal carbonates, $\gamma$-$Fe_2O_3$, azo and triazo compound pigments, heat stability agents such as cerium oxide and cerium hydroxide, and antioxidants can also be added.

An important component for imparting self-extinguishing properties to silicone elastomers which do not require transparency is titanium dioxide. Titanium dioxide has a synergistic action in combination with component (C) and component (D). Titanium dioxide to be used in this invention is the one which has been used as a pigment or as a heat stability agent. In particular, fumed titanium dioxide with an average particle size of 0.1 micrometer or less, which is produced from titanium tetrachloride industrially by pyrolytic hydrolysis, is preferably used. Titanium dioxide can be treated with organosilanes, organosiloxanes, organosilazanes or organic compounds. The amount of titanium dioxide added ranges from 0.5 to 20 parts by weight relative to 100 parts by weight of component (A). If it is less than 0.5 part by weight, the effect on the self-extinguishing ability is weak. If it exceeds 20 parts by weight, it interferes with the processability of silicone rubber compositions and with various physical properties of silicone elastomers obtained by vulcanization. In particular, the amount of titanium dioxide preferably ranges from 1 to 10 parts by weight.

The composition is homogeneously blended in a roll mixer or a kneader mixer. The composition is vulcanized by heating at 100°–450° C. under pressure or without pressure for a few seconds to one hour. After vulcanization, the cured rubber can be given additional heating at 200°–250° C. for 1 to 48 hours as a secondary heat treatment and a silicone rubber product with excellent flame retardancy is obtained.

Examples of this invention will be explained below. "Parts" indicated in the following examples implies "parts by weight."

The flame retardancy was measured by the following method. A test specimen (length 130 mm, width 13 mm, thickness 2 mm) was cut from the silicone rubber obtained by heat curing. This specimen was clamped vertically in a draft-free area. The test specimen was ignited by bringing the flame of a Bunsen burner (flame 11 mm, height of inner flame 20 mm, height of outer flame 40 mm) into a position such that the lower end of the test specimen was brought into close contact with the upper section of the inner flame for 15 seconds and the Bunsen burner was removed. The time required for the flame (seconds) to extinguish was observed. This flame contact test was repeated twice for five specimens and the average of the 10 observations (seconds) was used as the flame retardancy value. The transparency was determined by the following method. Two pieces of test specimens were placed together (thickness of 4 mm) on a No. 4 size printed character. When the letter was readable, the transparency was determined to be excellent.

The following examples are presented for illustrative purposes only and should not be construed as limiting the invention which is properly delineated in the claims.

EXAMPLE 1

A dimethylvinylsiloxy endblocked polydiorganosiloxane gum consisting of 99.8 mol% of dimethylsiloxane units, 0.2 mol% of methylvinylsiloxane units and having a degree of polymerization of 3000, (100 parts), polydimethylsiloxane having hydroxyl groups at both ends and having a degree of polymerization of 10, (5 parts), diphenylsilanediol (3 parts) and fumed silica with a specific surface area of 200 $m^2/g$ (Aerosil 200, manufactured by Nippon Aerosil Co., Tokyo, Japan, 50 parts) were homogeneously blended and heat-treated at 150° C. for 2 hours. This product was used as a base compound. 2,4-dichlorobenzoyl peroxide (0.8 part) was added to 100 parts of this base compound. Subsequently, a 2% isopropyl alcohol solution containing chloroplatinic acid hexahydrate, a fatty acid and a triazole derivative as shown in Table I were added to the above-mentioned mixture. The mixture obtained was homogeneously blended on a two-roll mixer and vulcanized at 120° C. under a pressure of 30 kg/$cm^2$ for 5 minutes. As a result, a sheet with a thickness of 2 mm was obtained. The flame retardancy test and the transparency test were conducted on this prepared sheet under the above-mentioned conditions. The results obtained are summarized in Table I.

As shown in Table I, excellent transparency was obtained in both the examples and the comparative examples. The flame retardancy was remarkably improved by adding a fatty acid. The effect of a triazole derivative on the flame retardancy was not so remarkable, but the flame retardancy was found to be improved using a triazole compound along with platinum and a fatty acid without interference with transparency.

TABLE I

| Composition | This invention | | | | | | Comparative Examples | |
|---|---|---|---|---|---|---|---|---|
| Base Compound (parts) | 100 | 100 | 100 | 100 | 100 | 100 | 100 | 100 |
| 2% isopropyl alcohol of $H_2PtCl_6 \cdot 6H_2O$ (parts) | 0.17 | 0.17 | 0.17 | 0.17 | 0.17 | 0.17 | 0.17 | 0.17 |
| Myristic acid ($C_{13}$) | | | | | | | | |

TABLE I-continued

| Composition | This invention | | | | | Comparative Examples | | |
|---|---|---|---|---|---|---|---|---|
| (parts) Stearic acid ($C_{17}$) | 0.5 | — | — | 0.5 | — | — | — | — |
| (parts) Behenic acid ($C_{21}$) | — | 0.5 | — | — | 0.5 | 0.5 | — | — |
| (parts) 30% isopropyl alcohol of benzotriazole (parts) | — | — | 0.5 | — | — | — | — | — |
| 2-(3',5'-di-t-butyl-2'-hydroxyphenyl)-benzo-triazole (parts) | — | — | — | 1.0 | 1.0 | — | — | — |
| Flame retardancy (seconds) | — | — | — | — | — | 0.5 | — | 0.5 |
| Transparency | 18 | 17 | 17 | 11 | 11 | 12 | 78 | 57 |
| | Good in all cases | | | | | Good in all cases | | |

EXAMPLE 2

A silicone rubber sheet was prepared using the same base compound as in Example 1 and a fatty acid metal salt instead of a fatty acid under the same conditions as in Example 1. The flame retardancy and transparency of the prepared sheet were determined. The results obtained are summarized in Table II. As a comparison, the results obtained in comparative examples in Example 1 are also shown in the same table.

The fatty acid metal salt was found to have almost the same flame-retarding effect as that of the fatty acid.

TABLE II

| Composition | This invention | | | | | | Comparative Examples | |
|---|---|---|---|---|---|---|---|---|
| Base compound (parts) | 100 | 100 | 100 | 100 | 100 | 100 | 100 | 100 |
| 2% isopropyl alcohol solution of $H_2PtCl_6 \cdot 6H_2O$ (parts) | 0.17 | 0.17 | 0.17 | 0.17 | 0.17 | 0.17 | 0.17 | 0.17 |
| Magnesium laurate (parts) | 0.5 | — | — | 0.5 | — | — | — | — |
| Aluminum myristate (parts) | — | 0.5 | — | — | 0.5 | — | — | — |
| Calcium stearate (parts) | — | — | 0.5 | — | — | 0.5 | — | — |
| 30% isopropyl alcohol solution of benzo-triazole (parts) | — | — | — | 1.0 | 1.0 | — | — | — |
| 2-(3',5'-di-t-butyl-2-hydroxyphenyl-benzo-triazole (parts) | — | — | — | — | — | 0.5 | — | 0.5 |
| Flame retardancy (seconds) | 20 | 18 | 17 | 13 | 12 | 12 | 78 | 57 |
| Transparency | Good in all cases | | | | | | Good in all cases | |

EXAMPLE 3

A silicone rubber sheet was prepared using the same base compound as in Example 1 and both a fatty acid and a fatty acid metal salt, as shown in Table III, were used; the conditions were the same as in Example 1. The flame retardancy and transparency of the prepared sheet were determined. The results obtained are summarized in Table III.

TABLE III

| Composition | This invention | | | |
|---|---|---|---|---|
| Base compound (parts) | 100 | 100 | 100 | 100 |
| 2% isopropyl alcohol solution of $H_2PtCl_6 \cdot 6H_2O$ (parts) | 0.17 | 0.17 | 0.17 | 0.17 |
| Stearic acid (parts) | 0.5 | — | 0.5 | — |
| Behenic acid (parts) | — | 0.5 | — | 0.5 |
| Calcium stearate (parts) | 0.5 | 0.5 | 0.5 | 0.5 |
| 30% isopropyl alcohol solution of benzo-triazole (parts) | — | — | 1.0 | 1.0 |
| Flame retardancy (parts) (seconds) | 16 | 15 | 10 | 10 |
| Transparency | Good in all cases | | | |

There was no synergistic effect of combining a fatty acid and a fatty acid metal salt. The effect of the combination on the flame retardancy was found to be almost the same as the effect of each compound alone.

EXAMPLE 4

A dimethylvinylsiloxy endblocked polydiorganosiloxane gum consisting of 96.5 mol% of dimethylsiloxane units, 0.5 mol% of methylvinylsiloxane units and 3 mol% of methylphenylsiloxane units (degree of polymerization 3500, 100 parts), polydimethylsiloxane having hydroxyl groups at both ends (degree of polymerization 10, 5 parts), diphenylsilanediol (4 parts) and fumed silica with a specific surface area of 200 m²/g (Aerosil 200, 55 parts) were blended homogeneously and heat-treated at 150° C. for 2 hours. The blend obtained was used as a base compound.

2,4-dichlorobenzoyl peroxide (0.8 part) was added to the above-mentioned base compound (100 parts). Subsequently, the components shown in Table IV were added to the mixture, and the mixture was blended homogeneously in a two-roll mixer. A silicone rubber sheet was prepared by vulcanization as in Example 1. The flame retardancy and transparency were determined. The results obtained are summarized in Table IV.

TABLE IV

| Composition | This invention | | | | | | Comparative Examples | |
|---|---|---|---|---|---|---|---|---|
| Base compound (parts) | 100 | 100 | 100 | 100 | 100 | 100 | 100 | 100 |
| 2% isopropyl alcohol solution of $H_2PtCl_6 \cdot 6H_2O$ (parts) | 0.17 | 0.17 | 0.17 | 0.17 | 0.17 | 0.17 | 0.17 | 0.17 |
| Stearic acid ($C_{17}$) | 0.1 | 0.5 | 1.0 | 0.5 | 0.5 | 0.5 | — | — |
| Calcium stearate (parts) | — | — | — | 0.5 | — | — | — | — |
| 2-(2'-hydroxy-5'-methylphenyl)benzotriazole (parts) | — | — | — | — | 0.5 | 0.5 | — | 0.5 |
| Flame retardancy (seconds) | 16 | 14 | 13 | 13 | 9.2 | 8.6 | 67 | 49 |
| Transparency | Good in all cases | | | | | | Good in all cases | |

EXAMPLE 5

2,4-dichlorobenzoyl peroxide (0.8 part), fumed titanium dioxide having a particle size less than 0.1 micrometer (Titanoxide P-25, Manufactured by Degussa, Frankfurt AM Main, West Germany, 5 parts), a 2% isopropyl alcohol solution containing chloroplatinic acid hexahydrate (0.17part) and a fatty acid (0.5 part) were added to 100 parts of the base compound of Example 1. After homogeneously blending the mixture in a two-roll mixer, the mixture was vulcanized at 120° C. under a pressure of 30 kg/cm² for 5 minutes and a sheet with a thickness of 2 mm was produced. The flame retardancy test was conducted under the above-mentioned conditions. The results obtained are summarized in Table V.

As shown in Table V, the flame retardancy obtained using combinations of platinum and titanium dioxide or platinum and fatty acids was not as good as the flame retardancy with a combination of platinum, titanium dioxide and fatty acid. The same experiment was repeated using liquid paraffins and castor oil. No such effect on flame retardancy was obtained.

Silicone rubber sheets were prepared as described in this example, except a pigment grade titanium dioxide sold as Tipaque A-100 manufactured by Ishihara Industries, Ohsaka, Japan was used in place of the fumed titanium dioxide. This pigment grade titanium dioxide is manufactured by a chlorine process and has an average particle size of 0.20 to 0.35 micrometer. The results obtained are summarized in Table V.

TABLE V

| Composition | This invention | | | | | | Comparative Examples | | |
|---|---|---|---|---|---|---|---|---|---|
| Base compound (parts) | 100 | 100 | 100 | 100 | 100 | 100 | 100 | 100 | 100 |
| 2% isopropyl alcohol solution of $H_2PtCl_6 \cdot 6H_2O$ (parts) | 0.17 | 0.17 | 0.17 | 0.17 | 0.17 | 0.17 | 0.17 | 0.17 | 0.17 |
| Fumed titanium dioxide (parts) | 5 | 5 | 5 | — | — | — | — | — | 5 |
| Pigment titainum dioxide (parts) | — | — | — | 5 | 5 | 5 | — | — | — |
| Myristic acid (parts) | 0.5 | — | — | 0.5 | — | — | — | — | — |
| Stearic acid (parts) | — | 0.5 | — | — | 0.5 | — | 0.5 | — | — |
| Behenic acid (parts) | — | — | 0.5 | — | — | 0.5 | — | — | — |
| Flame retardancy (seconds) | 8.1 | 7.6 | 7.4 | 8.3 | 7.9 | 7.5 | 17 | 78 | 16 |

Example 6

A silicone rubber sheet was prepared using the same base compound as in Example 1 and a fatty acid metal salt instead of a fatty acid under the same conditions as in Example 5. The same flame retardancy test was conducted. The results obtained are summarized in Table VI. A fatty acid metal salt was found to have almost the same flame-retarding effect as that of fatty acid used in combination with titanium dioxide and chloroplatinic acid hexahydrate.

TABLE VI

| Composition | This invention | | | | | Comparative Examples |
|---|---|---|---|---|---|---|
| Base compound (parts) | 100 | 100 | 100 | 100 | 100 | 100 |
| 2% isopropyl alcohol solution of $H_2PtCl_6 \, 6H_2O$ (parts) | 0.17 | 0.17 | 0.17 | 0.17 | 0.17 | 0.17 |
| Titanium dioxide (parts) | 5 | 5 | 5 | — | — | 5 |
| Magnesium laurate (parts) | 0.5 | — | — | — | — | — |
| Aluminum myristate (parts) | — | 0.5 | — | 0.5 | — | — |
| Calcium stearate (parts) | — | — | 0.5 | — | — | — |
| Flame retardancy (seconds) | 8.8 | 8.6 | 8.0 | 18 | 78 | 16 |

EXAMPLE 7

A silicone rubber sheet was prepared using the same base compound as in Example 1 and both a fatty acid and a fatty acid metal salt were used and the conditions were the same as in Example 1. The same flame retardancy test was conducted. The results obtained are summarized in Table VII. There was no synergistic effect of combining a fatty acid and a fatty acid metal salt. The effect of the combination on the flame retardancy was found to be almost the same as the effect of each compound alone.

TABLE VII

| Composition | This invention | | | |
|---|---|---|---|---|
| Base compound (parts) | 100 | 100 | 100 | 100 |
| 2% isopropyl alcohol solution of $H_2PtCl_6 \cdot 6H_2O$ (parts) | 0.17 | 0.17 | 0.17 | 0.17 |
| Titanium dioxide (parts) | 5 | 5 | 5 | 5 |
| Stearic acid (parts) | 1.0 | — | 0.5 | — |
| Behenic acid (parts) | — | 1.0 | — | 0.5 |
| Calcium stearate (parts) | — | — | 0.5 | 0.5 |
| Flame retardancy (seconds) | 6.4 | 6.3 | 6.7 | 6.7 |

EXAMPLE 8

2,4-dichlorobenzoyl peroxide (0.8 part) was added to 100 parts of the base compound of Example 4. Subsequently, the components shown in Table VIII were added to the mixture and the mixture was homogeneously blended in a two-roll mixer. A silicone rubber sheet was prepared by the vulcanization treatment as in Example 1. The same flame retardancy test was conducted. The results obtained are summarized in Table VIII.

Titanium dioxide as used in Example 5 was used.

TABLE VIII

| Composition | This invention | | Comparative Examples | |
|---|---|---|---|---|
| Base compound (parts) | 100 | 100 | 100 | 100 |
| 2% isopropyl alcohol solution of $H_2PtCl_6 \cdot 6H_2O$ (parts) | 0.17 | 0.17 | 0.17 | 0.17 |
| Titanium dioxide (parts) | 5 | 5 | — | 5 |
| Stearic acid (parts) | 0.5 | — | — | — |
| Behenic acid (parts) | — | 0.5 | — | — |
| Flame retardancy (seconds) | 5.8 | 5.6 | 67 | 14 |

That which is claimed is:

1. A flame retardant silicone rubber composition comprising
   (A) 100 parts by weight of an organopolysiloxane of the average unit formula $R_a SiO_{(4-a)/2}$ wherein each R represents a substituted or unsubstituted monovalent hydrocarbon radical and a has a value of from 1.95 to 2.05,
   (B) 10 to 150 parts by weight of a finely pulverized silica filler,
   (C) 2 to 200 ppm of platinum based on the weight of (A) or a platinum compound providing an equivalent amount of platinum,
   (D) 0.05 to 3 parts by weight of a fatty acid compound where the fatty acid of the compound has at least 11 carbon atoms selected from the group consisting of a fatty acid, a metal salt of the fatty acid, or a mixture thereof, and
   (E) 0.1 to 5 parts by weight of an organic peroxide.

2. The composition according to claim 1 further comprising a triazole compound in an amount of one part by weight or less.

3. The composition according to claim 1 in which the organopolysiloxane is a polydiorganosiloxane.

4. The composition according to claim 3 in which the polydiorganosiloxane of (A) is a gum; the finely pulverized silica filler of (B) has a specific area of more than 100 m²/g, and is selected from the group consisting of fumed silica and precipitated silica, and is present in an amount of from 20 to 70 parts by weight; (C) is a platinum compound present in an amount sufficient to provide from 5 to 100 ppm based on the weight of (A); (D) is present in an amount of 0.1 to 2 parts by weight; and (E) is present in an amount of 0.1 to 1.5 parts by weight.

5. The composition according to claim 4 in which the platinum compound is chloroplatinic acid hexahydrate.

6. The composition according to claim 4 further comprising a triazole compound in an amount of from 0.1 to 0.7 part by weight.

7. The composition according to claim 5 further comprising a triazole compound in an amount of from 0.1 to 0.7 part by weight.

8. The composition according to claim 1 in which the fatty acid compound of (D) is a saturated fatty acid compound.

9. The composition according to claim 2 in which the fatty acid compound of (D) is a saturated fatty acid compound.

10. The composition according to claim 4 in which the fatty acid compound of (D) is a saturated fatty acid compound.

11. The composition according to claim 7 in which the fatty acid compound of (D) is a saturated fatty acid compound.

12. The composition according to claim 8 in which (D) is a metal salt of the fatty acid wherein the metal is selected from the group consisting of zinc, calcium, aluminum, and magnesium.

13. The composition according to claim 9 in which (D) is a metal salt of the fatty acid wherein the metal is selected from the group consisting of zinc, calcium, aluminum, and magnesium.

14. The composition according to claim 10 in which (D) is a metal salt of the fatty acid wherein the metal is selected from the group consisting of zinc, calcium, aluminum, and magnesium.

15. The composition according to claim 11 in which (D) is a metal salt of the fatty acid wherein the metal is selected from the group consisting of zinc, calcium, aluminum, and magnesium.

16. The composition according to claim 8 in which (D) is the fatty acid.

17. The composition according to claim 9 in which (D) is the fatty acid.

18. The composition according to claim 10 in which (D) is the fatty acid.

19. The composition according to claim 11 in which (D) is the fatty acid.

20. The composition according to claim 5 in which (D) is a fatty acid selected from the group consisting of myristic acid, stearic acid, and behenic acid.

21. The composition according to claim 7 in which (D) is a fatty acid selected from the group consisting of myristic acid, stearic acid, and behenic acid, and the triazole is selected from the group consisting of benzotriazole and 2-(3',5'-di-t-butyl-2'-hydroxylphenyl)-benzotriazole.

22. The composition according to claim 5 in which (D) is a metal salt of a fatty acid selected from the group consisting of magnesium laurate, aluminum myristate, and calcium stearate.

23. The composition according to claim 7 in which (D) is a metal salt of a fatty acid selected from the group consisting of magnesium laurate, aluminum myristate, and calcium stearate, and the triazole is selected from the group consisting of benzotriazole and 2-(3',5'-di-t-butyl-2'-hydroxylphenyl)-benzotriazole.

24. The composition according to claim 5 in which (D) is a mixture of stearic acid and calcium stearate.

25. The composition according to claim 7 in which (D) is a mixture of stearic acid and calcium stearate, and the triazole compound is benzotriazole.

26. The composition according to claim 5 in which (D) is a mixture of behenic acid and calcium stearate.

27. The composition according to claim 7 in which (D) is a mixture of behenic acid and calcium stearate, and the triazole compound is benzotriazole.

28. The composition according to claim 1 further comprising 0.5 to 20 parts by weight of titanium dioxide.

29. The composition according to claim 28 in which the titanium dioxide is fumed titanium dioxide having an average particle size of 0.1 micrometer or less.

30. The composition according to claim 28 in which the titanium dioxide is present in an amount of 1 to 10 parts by weight.

31. The composition according to claim 29 in which the titanium dioxide is present in an amount of 1 to 10 parts by weight.

32. The composition according to claim 4 further comprising 1 to 10 parts by weight of titanium dioxide.

33. The composition according to claim 32 in which the titanium dioxide is fumed titanium dioxide having an average particle size of 0.1 micrometer or less.

34. The composition according to claim 33 in which the platinum compound is chloroplatinic acid hexahydrate.

35. The composition according to claim 34 in which the fatty acid compound of (D) is a saturated fatty acid compound.

36. The composition according to claim 35 in which (D) is the fatty acid.

37. The composition according to claim 36 in which the fatty acid is selected from the group consisting of myristic acid, stearic acid, and behenic acid.

38. The composition according to claim 35 in which (D) is a metal salt of the fatty acid wherein the metal is selected from the group consisting of zinc, calcium, aluminum, and magnesium.

39. The composition according to claim 35 in which (D) is a metal salt of a fatty acid selected from the group consisting of magnesium laurate, aluminum myristate, and calcium stearate.

40. The composition according to claim 35 in which (D) is a mixture of stearic acid and calcium stearate.

41. The composition according to claim 35 in which (D) is a mixture of behenic acid and calcium stearate.

* * * * *